US011675546B2

(12) United States Patent
Bermundo et al.

(10) Patent No.: US 11,675,546 B2
(45) Date of Patent: Jun. 13, 2023

(54) UNIFIED AND DECENTRALIZED MACHINE INTERFACE FOR CONTROL OF MULTI-PRINTER SYSTEMS

(71) Applicant: KYOCERA Document Solutions, Inc., Osaka (JP)

(72) Inventors: Neil-Paul P. Bermundo, Glendora, CA (US); Warren Intruzo San Jose, Torrance, CA (US); Kunihiko Shimamoto, Torrance, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 17/506,570

(22) Filed: Oct. 20, 2021

(65) Prior Publication Data

US 2023/0120813 A1 Apr. 20, 2023

(51) Int. Cl.
*G06F 3/12* (2006.01)
(52) U.S. Cl.
CPC .......... *G06F 3/1205* (2013.01); *G06F 3/1207* (2013.01); *G06F 3/1232* (2013.01); *G06F 3/1253* (2013.01); *G06F 3/1291* (2013.01)
(58) Field of Classification Search
CPC .... G06F 3/1205; G06F 3/1207; G06F 3/1232; G06F 3/1253; G06F 3/1291
See application file for complete search history.

(56) References Cited

U.S. PATENT DOCUMENTS

| 3,923,139 | A | * | 12/1975 | Mesnil | ...................... B41J 5/46 400/73 |
|---|---|---|---|---|---|
| 7,038,808 | B2 | | 5/2006 | Yamakado et al. | |
| 8,339,660 | B2 | | 12/2012 | Kageyama et al. | |
| 2002/0015177 | A1 | * | 2/2002 | Yamakado | ............. G06K 15/00 358/1.15 |
| 2006/0279775 | A1 | * | 12/2006 | Matsumoto | ........... G06F 3/1285 358/1.15 |
| 2010/0171983 | A1 | * | 7/2010 | Asakawa | ........... H04N 1/00896 358/1.15 |
| 2011/0023054 | A1 | * | 1/2011 | Yamazaki | ............... G06F 9/451 719/321 |

* cited by examiner

*Primary Examiner* — Iriana Cruz
(74) *Attorney, Agent, or Firm* — Rowan TELS LLC

(57) ABSTRACT

A method and apparatus to implement a unified and decentralized machine interface for control of multi-printer systems is disclosed. A master controller device accepts a selection control from a user indicating a plurality of selected printers from printers connected to the master controller device by a network. The master controller device accepts an operation control from the user, indicating at least one printer operation to be performed on the plurality of selected printers. The master controller broadcasts a simultaneous control signal to the plurality of selected printers with data instructing the printers to immediately perform at least one printer operation, triggering, substantially simultaneously with the broadcasting of the simultaneous control signal, performance of the at least one printer operation at the plurality of selected printers, and performing the at least one printer operation substantially simultaneously at the plurality of selected printers immediately upon receiving the simultaneous control signal.

25 Claims, 9 Drawing Sheets

UNIFIED AND DECENTRALIZED MACHINE INTERFACE FOR CONTROL OF MULTI-PRINTER SYSTEMS

BACKGROUND

Where there are multiple printers, such as in print shops, offices, printer development and manufacturing factories, printer training facilities, expos, sales floors, or printer testing and repair facilities, it may be desirable to perform a sequence of printer panel operations or printing operations on multiple printers at the same time, asynchronously, simultaneously, or in-parallel. This may be either for quality testing and performance evaluation of the printers or for producing the same set of operations on multiple printers or imaging devices at the same time without having to physically approach each printer and perform each and the same exact operation at every printer. So much time may be saved if the same set of front panel navigation, operation, or processing options were to be performed at one "master" printer or other controlling device and reflected, coordinated, and performed automatically and electronically on the other printers at the same time (asynchronously and in-parallel).

Conventional approaches involve sending a print job from a single source, such as a computer, to multiple printers at the same time. This is known as tandem-printing. Another existing approach is distributing a common configuration from one source, such as a print server or computer server, and installing that configuration or firmware to multiple printers. This latter scenario is usually not used to install configuration or firmware to the multiple printers. Normally these actions are performed by sequentially installing firmware on multiple printers or applying a common configuration to multiple printers. These sequential, scheduled, or otherwise ordered and non-simultaneous actions may take a significant amount of time.

These conventional solutions and workflows, however, do not address manipulation of a user interface such as a front panel, connected mobile app, web page interface, etc., to navigate through printer features for multiple printers simultaneously. For example, these solutions do not support an operation such as scanning a page loaded in each printer's document table simultaneously, in parallel, asynchronously, or at the same exact time. Even with multiple people standing beside each printer, this level of simultaneous control may not be possible. It may be desirable for quality testing or performance evaluation of a set of printers, to initiate such scanning, or to start processing a print job from a universal serial bus (USB) device (e.g., a drive or dongle) connected to one printer or to shared network storage, simultaneously across printers in order to determine a precise time variation among the printers. Such operations conventionally rely on modified firmware code including profiling functions and timestamp tracking and calculation to measure when first and last pages of a job come out. These options may be simple when used to measure initiation and completion indication signals, but become more complex when accounting for the speed of mechanical portions of a printer such as paper feed, sorting or collating, stapling, and other such physical processes that may vary in speed and may not be directly measurable from a timestamp. The information provided through such complex methods may also be more detailed than is truly helpful, if one simply wishes to keep track of a fastest machine and slowest machine among a set of printers.

Further, when a bug or problem is reported from quality control testers or from customers, a number of steps may need to be performed to reproduce the issue. Once the problem is solved by the developers, these steps need to be re-performed on multiple printers to validate the bug fixes. When there are several to very many printers involved in troubleshooting and solution testing, whether of the same model or varying models, it is time-consuming to perform the multiple steps needed manually or sequentially. The quickest solution with conventional printing systems may involve stationing people at each printer to perform the specified actions in parallel. Performance of the steps by different people may lead to inconsistent testing. Even with a given step-by-step guide, people may have differing levels of expertise in using the printers under test, leading to variations in accuracy and speed in completing the steps.

Additional coordination challenges may lead to unreliable, inconsistent, or unpredictable results. Devices under test may not be located in the same room but may be spread across multiple floors or even multiple office locations. Beginning coordinated tests at the same time may be difficult. Some testers may miss a step or may be behind or ahead of other testers as discussed above, but testers may also become uncoordinated due to glitches such as running out of paper, paper jams, or the need to repeat steps that at first may not activate. Uncoordinated sequences may then lead to variation in functionalities, operations, and results, leading to unreliable or inconsistent testing outcomes.

If stopwatches are used to time completion of steps or sets of steps on several to very many printers, timing of each stopwatch may differ from the others, or there may be variation in how precisely each watch is started and stopped in conjunction with the actions to be timed. Additional time may be then needed to tabulate timing results after all testing and measurements are complete.

In addition, propagation delays may occur when there is a networking glitch or an issue in file or disk I/O operations, and may also be caused by varying networking transfer speeds of data due to varying locations and distances of printers among one another, and between printers and a source device. Some printers may also be inherently slow due to older or lower quality hardware components when compared to newer models, leading to delayed or slower progress in the operational steps. Other delays may be caused by disturbances on the printers such as people doing unexpected panel operations, printing, scanning, or similar operations. Other delays could be due to printer issues such as paper jams, out-of-paper, out-of-ink, toner-waste full situations, full output tray situations, and similar situations, many, if not all of which, would need people to service the printer before other activities resume.

In addition to challenges presented by coordinated troubleshooting and testing, conventional printing systems also suffer from constraints when training users in printer operation. When demonstrating printer operations and features of several to very many printers, the only conventional method for hands-on training is to station both a trainer and trainee at each of the several to very many printers. Even then, there may be communication and coordination issues as described above.

Conventional approaches to firmware deployment may use a single application, and thus may be applied consistently to several to very many printers. However, the application is still conventionally applied to printers in sequence, as one information technology (IT) staff performs the necessary steps at one printer at a time until all of the printer configurations are updated. This takes time and increases the opportunities for error. Steps may be missed, or entire devices may be missed, which can have adverse affects at production sites. For example, in hospital and health services IT departments, mistakes in firmware updates can cause significant problems.

Conventional tools do not provide a way to perform other operations such as guided operation on front panels (for demonstrating use or for coordinated operations). The only way to do a coordinate operation on several printers is to station people at each printer, and perhaps show a video or presentation that the stationed personnel can view, listen to, and follow to perform the step-by-step operations. Even then, there is no feedback to the one doing the demonstration, testing, or teaching, which may be in another device in some other location or office space.

In summary, conventional solutions rely on multiple persons navigating and operating multiple printer user interfaces, either needing one or more personnel at each printer, or taking the equivalent person hours across a longer span of time as one person operates multiple printers in series. These persons must physically approach and stand at each printer during these operations. Human error or variations in machine readiness or repair may lead to uncoordinated and unreliable results. Printer firmware cannot adequately support quality testing or performance evaluation without the addition of profiling code. And user interfaces of multiple printers may not be navigated simultaneously, but must be done in sequential order, on a time schedule, or using some other, often cumbersome, predetermined ordering.

To address these challenges and deficiencies, there is a need for a solution that provides a common view of printer capabilities and user interfaces across multiple printers and that allows a single user to perform a common set of actions, such as panel navigation, configuration, firmware installation, printer functions, etc., on all selected or detected networked devices, such as printers or other imaging devices, in parallel, based on the actions of the single user.

BRIEF SUMMARY

In one aspect, a method includes configuring a master controller device to accept a selection control from a user, the selection control indicating a plurality of selected printers from printers connected to the master controller device by a network, configuring the master controller device to accept an operation control from the user, the operation control indicating at least one printer operation to be performed on the plurality of selected printers, broadcasting a simultaneous control signal from the master controller device to the plurality of selected printers, the simultaneous control signal includes data instructing the plurality of selected printers to immediately perform the at least one printer operation, triggering, substantially simultaneously with the broadcasting of the simultaneous control signal, performance of the at least one printer operation at the plurality of selected printers, and performing the at least one printer operation substantially simultaneously at the plurality of selected printers immediately upon receiving the simultaneous control signal.

In one aspect, a computing apparatus includes a processor. The computing apparatus also includes a memory storing instructions that, when executed by the processor, configure the apparatus to configure a master controller device to accept a selection control from a user, the selection control indicating a plurality of selected printers from printers connected to the master controller device by a network, configure the master controller device to accept an operation control from the user, the operation control indicating at least one printer operation to be performed on the plurality of selected printers, broadcast a simultaneous control signal from the master controller device to the plurality of selected printers, the simultaneous control signal includes data instructing the plurality of selected printers to immediately perform the at least one printer operation, trigger, substantially simultaneously with the broadcast of the simultaneous control signal, performance of the at least one printer operation at the plurality of selected printers, and perform the at least one printer operation substantially simultaneously at the plurality of selected printers immediately upon receiving the simultaneous control signal.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
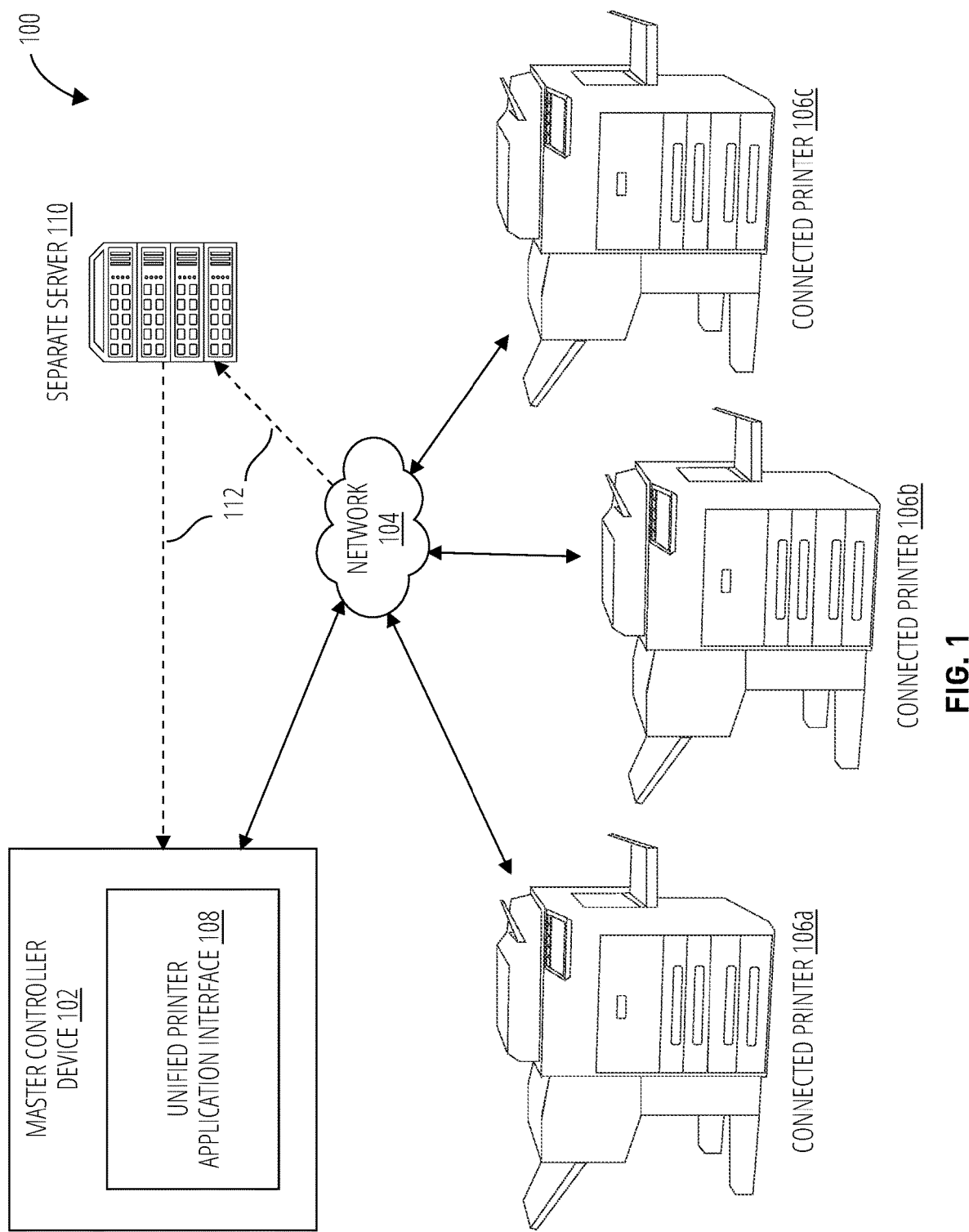
FIG. 1 illustrates a unified printer system 100 in accordance with one embodiment.

The disclosed solution provides a novel and improved method to perform testing, training, and firmware upgrade deployment, on several or very many printers from a single computer or printer. The solution addresses the technical problems facing conventional methods, such as the need for one or more personnel at any printer being acted upon, the excessive time needed when operations cannot be performed in parallel, timing inconsistencies in coordinating actions by multiple people on multiple printers, or among printers of differing capability or state of readiness or repair, the increased risk of human error with multiple personnel of varying expertise involved in performing the actions, the time consuming, tedious, and error prone process of manually tabulating timing results, etc. The solution provides the ability to demonstrate features and performing operations on several devices at once for the benefit of an audience, whether at the quality control testing center, at an expo, at a classroom, or at offices. A trainer, manager, tester, developer, or even a customer can show operations performed on one device to several or very many printers that other people can observe on. The disclosed solution also allows IT staff to perform configuration changes, firmware installs, and other administrative operations on several to very many printers consistently, comprehensively, and quickly.

With the disclosed invention, operations on the several to very many printers may be completed in a programmatically coordinated way. For teaching purposes, the solution may provide prompts (such as a wizard interface) to people stationed at printers, guiding them to perform the correct steps with the appropriate timing. Feedback and testing results may be gathered and available instantly after each performed steps, and may be displayed to a person performing the primary operations at a master controller or source device.

Programmatic coordination may be implemented at each operational step using the disclosed solution. In this manner, the solution may address difficulties arising from propagation delays among printers being acted upon. As each step is performed at a master controller, the action and the data may be sent to the connected, registered, or subscribed printers. Each printer may then execute, perform, or apply the action and data. Results, including performance data, captured page images, register values, memory dumps, and the like, may be gathered at each printer, then sent back to the master controller. Only then, when the master controller receives status updates, feedback, results, and data from the connected, registered, or subscribed printers, will it proceed to the next step. This capability may allow operations on the printers to be coordinated with the master controller. If a printer needs service, such as having paper loaded, ink cartridges replaced, or similar actions, the status, results, and data may then be delayed in arriving at the master controller. The master controller may wait until such situations are resolved, or until the "online" printer status, feedback, results, and data are received from the affected printers.

In one embodiment, connected, registered, or subscribed printers may send their status updates, feedback, results, and data to a software service running on a server other than the master controller. The master controller may then check for the needed data and status of the printers from the said software service. In another embodiment, it is possible that printers with issues that would need people to service them, even necessitating an administrative decision, may be excluded or removed from the connected, registered, subscribed, or monitored list of printers so that the master controller may proceed with the operations. A notification or prompt may be sent to the IT staff, manager, or engineer at the master controller informing about the situation, and a choice may be made to exclude the affected printers or to continue waiting until the printer issues are resolved. These capabilities are not currently available in conventional solutions, and may represent an enhancement in capabilities during printer development, sales activities, feature demonstrations, and other uses of the printers, such as in teaching environments, health services for printer administrations and operations, among others.

The disclosed solution resolves the deficiencies of such solutions as tandem printing or installation of common firmware or setting up a common configuration across multiple printers from a single source. The solution disclosed herein allows a single user to initiate an explicit action or process from a single location provided with a common user interface, or from a single printer user interface. This user may select and modify the configuration of multiple printers from that one location, and to reflect the printer panel navigation, manipulation, and operation actuated at that location on the printer panels of multiple printers at the same time.

The disclosed solution may further install firmware at multiple locations such that the firmware may be accessible to all of the printers via a universal serial bus device, or via network storage, connected to one printer or to a central computing device. All of the printers may be controlled to begin installing the software and confirm the start of installation from that single printer or device. The installation may occur at the same time, in parallel, or asynchronously, and not according to a time schedule or sequential or other predetermined ordering.

The disclosed solution additionally allows for actual manipulation and navigation in printers through their user interfaces from one location and the action and navigation movement reflected in-parallel, asynchronously or at the same time on all the user interfaces of the various printers. From performing the action in one place, it may be possible to perform processing at the printers, such as scanning, faxing, job storage, or printing, as though a user were standing at each of the other printers at the same time, able to control all printers and navigate their user interfaces at the same time.

No conventional system, method, nor service allows this ability to navigate various printer user interfaces from one location and in parallel, asynchronous, simultaneous, or at the same time. The disclosed solution may provide this service to save time on the operation of multiple printers for synchronized navigation on printer user interfaces and for synchronized operations on the printers, such as faxing, scanning, job storage, image processing, or printing.

For the purposes of this disclosure, "synchronized printer control" refers to the control of multiple printers in a manner that is asynchronous, in-parallel, simultaneous or at the same time. This is not merely the distributing of some data from one printer to other printers where such data are processed independently when received at those other printers. This is real-time reflection of data, movement, navigation, and processing as it happens in a single printer to multiple printers.

"Navigation" on printer user interface refers to the movement, such as keyboard navigation or cursor or mouse pointer movement as those are used to navigate a user interface. The same navigation movements may be reflected and made into effect as they happen in one printer and reflected onto other printers.

"Master controller" identifies the system, device, or service that contains, integrates, or implements the embodiments of this disclosure, including the "Unified Printer Application Interface" and the "Unified Printer Panel Interface". The former may execute and run on a computer, tablet, web management page, or mobile device. The latter may execute and run in a printer at its user interface, such as its printer panel or a connected display device.

The synchronized printer control solution comprises a system, services, methods, and devices that provide simultaneously, in parallel, or asynchronously, control of the navigation of a user interface and of printer features and settings, as well as allowing the performance of operations such as scanning, faxing, image processing, or printing. The two embodiments may be configured to operate as follows.

Unified Printer Application Interface:
    Present list of printers to a user for selection of printers to control.
    Gather common, compatible, and applicable settings on selected printers.
    Package the gathered settings and present a unified user interface.
    Allow user to perform operation on the unified user interface.

As user navigates on the unified user interface, reflect each movement, change, or process on the other printers.

Unified Printer Panel Interface
Enable Synchronize Printer Control Feature in one printer.
Present list of printers to a user for selection of printers to control.
Gather common, compatible, and applicable settings on selected printers.
Package the gathered settings and show a unified user interface at the current printer.
Allow user to perform operation on the unified panel interface at a current printer.
As user navigates on the unified panel interface at the current printer, reflect each movement, change, or process on the other selected printers.

For the purposes of this disclosure, an application that controls other printers and the printer with user interface that will be used to control other printers can be grouped together using the term "master controller".

Embodiment 1: Unified Printer Application Interface System Design

The first embodiment may comprise a master controller application showing a unified user interface representing all common, compatible, and applicable features and settings of selected printers. The application may run in a computer, tablet, mobile device, or web site. The device or system where this embodiment resides may be designated as a master controller in an application form factor. This first embodiment may comprise a master controller application, updates to the printer firmware, and updates to its printer panel firmware.

The master controller application may show a list of printers in the network, and allow a user to select printers to be controlled. The application may gather data from the selected printers about their printer capabilities. The gathered data may consist of features and settings for each selected printer. The application may gather a common set of features and settings that exist and are fully supported at all of the selected printers. In another embodiment, the unified printer application interface may form a universal set of features and settings, where some features and settings may not be supported in some printers.

The application may package the gathered data received to form a unified user interface. The user interface may be designed to appear like the printer panel of the printers, to provide an interface familiar to printer users. The user interface may alternately be designed as a generic, universal, and easy-to-use interface that does not necessarily appear like the controlled printers. The application may then display the unified user interface to the user and allow the user to navigate, operate, and make changes to the features and settings shown in the unified user interface. Each action navigation, movement, change, or event that occurs in the unified user interface may be packaged by the application. The packaged data may be broadcast to selected controlled printers.

Embodiment 2: Unified Printer Panel Interface System Design

The second embodiment may comprise the updates to the printer firmware and updates to its printer panel firmware. Since the control of a printer is a common component in both embodiments, the details for the printer firmware update and the printer panel firmware update may be common, and thus applicable to both embodiments.

Printer Panel Firmware Update

The printer's panel firmware may be updated to support a synchronized printer control feature. Printer panel firmware may perform the following when the synchronized printer control feature is turned ON, and when the printer is designated as a master controller.

The printer panel may show a new user interface element, such as a new control in the form of a button, image, or visual hint that identifies the synchronized printer control feature. Interacting with the control may turn the synchronized printer control feature ON or OFF. In one embodiment, this may include suspending or pausing the functioning of the synchronized printer control feature. In another embodiment, it may include a capability to reset or turn OFF or ON this feature on a controlled printer.

Workflow for Master Controller in Printer Panel Firmware

This update may consist of the following capabilities, methods, and services. The printer panel firmware may show a list of networked printers that is compatible with the printer model. The user may select which printers are desired to be controlled. The printer panel firmware may capture panel operations such as movements, navigations, and changes to features and settings performed by the user on the user interface. These operations on the printer panel may be captured and packaged.

For triggering actions, such as printing, scanning, faxing, image processing, job storage, and the like, a signal may be sent to printer firmware (raster image processor or RIP, job layer, or underlying engine firmware) to trigger inclusion of printer firmware data, such as print job, scanned job, information about source of image to be scanned or printed, and the like). This data may be included in the package to be sent to controlled remote printers. The packaged data (indicated user operations and firmware data) may be broadcast to selected printers for execution or application in those remote printers.

Workflow for Receiving Printer (Bot Master Controller) in Printer Panel Firmware Printer panel firmware may process data received from the master controller via network or other means of connectivity. This may involve reflecting movement of a cursor, mouse pointer, or other visual indicators on the printer panel, such as highlighting, lighting effects, or other effects. This may involve reflecting changes to features and/or settings on the printer panel, if the received data is supported, applicable, compatible, or can be translated for application or execution at the printer. While it is ON, in one embodiment, the printer may ignore incoming synchronized printer control data received from a master controller so as not to affect the operation of the printer during the use of the synchronized printer control feature at the said printer. In another embodiment, it may honor and not ignore the incoming data. This may provide flexibility for other use cases that may be needed during printer device development or use.

Printer Firmware Update

The printer firmware may also be updated to support the synchronized printer control feature. For a printer capable of acting as a master controller, the printer firmware may be updated to react and gather data based on user actions at the master controller application user interface or at the master controller printer user interface. At a recipient printer (not a master controller), the printer firmware may also be updated so that the printer may receive and process data from at least one or any master controller device. This printer firmware update may include the capabilities, methods, and services described below.

Workflow for Master Controller in Printer Firmware

The printer firmware may gather events and data being processed at the master controller device. These gathered events and data may be meant to be shared and reflected to the controlled remote printers. This may include information about print jobs, scanned jobs, faxed jobs, and so on, such as the source of the print job in the network. The print job may thus be captured and shared to remote printers for re-processing at those remote printers.

The printer firmware may send the captured data to the other selected controlled printers. The sending of this captured data may be triggered by an action at the master Controller, such as an action to start scanning (e.g., pressing "Scan" control or "Start capture" control, or the like), start faxing, start printing, start image processing, etc. Data may be gathered from underlying firmware components, including panel firmware, which in turn, may have captured and packaged data for broadcasting to the controlled remote printers. The printer firmware may relay the gathered and packaged data, if necessary, to the other printer firmware components, such as the communication and networking layer, so as to broadcast and pass the data to the controlled remote printers.

Workflow for Receiving Printer (not Master Controller) in Printer Firmware

The printer firmware may be updated to parse and interpret incoming data for presence of or identifying attributes for the synchronized printer control feature. The incoming data may comprise panel operations (i.e., navigation, movements, highlighting, visual effects, or changing of features and/or settings) on the printer panel user interface or from a master controller application's user interface. The incoming data may include actual data sent from a master controller for processing at the printer, including print jobs or source of print jobs. The data may contain additional information to instruct the printer on how and where to retrieve data externally from cloud storage, shared network storage, a USB dongle, or other connections, as may be necessary.

When a received action or event in panel is a trigger action such as print, scan, and the like, the printer may retrieve and use the needed data for such action or event. This may be achieved through instructions such as job parameters, eXchange Job Definition Format (XJDF)/Job Definition Format (JDF), eXtensible Markup Language (XML), or other page description language (PDL) job ticketing features. The job ticket may be included and identified in the incoming signal or print job as part of synchronized printer control feature data. Received data may be parsed and interpreted for action on the printer. If data received involves panel operations, the data may be relayed to the printer panel firmware. If data received are for processing at the printer, the receiving printer may act upon the data accordingly. For example, if data is for a print job, the receiving printer may print it. If data involves a command to scan, process image, store a print job, or retrieve a print job from some source, including cloud, shared network storage, USB dongle, or other connections and sources, the receiving printer may perform such action accordingly.

If data received is a command for firmware update, the printer may perform firmware update. For this, the printer may retrieve the location of firmware from the received data if it is not included. The system may be modified and system access and scripts set up to perform firmware update. The firmware update may be started and executed, including possible rebooting of the printer. If there is any part of the data that is not supported, not available, or not able to be completed due to resource availability (like low toner or low paper), options may be presented to the user for action. The user may be prompted whether to delegate to another capable machine, cancel the job entirely, or cancel the part of the job that cannot be processed on the printer. The user may be able to force processing of the job, knowing parts of it may not take effect, may not be processed, or may cause an error.

In another embodiment, the choice of action in such a scenario as above may already be included as a job parameter in the print job, such that the user pre-selects the choice of action prior to sending the print job. In one embodiment, the application may tailor or translate the data to accommodate the limitations of the target printer to accommodate incompatible selected printers. This may be a solution method when forcing processing of print job on a target printer which cannot fully handle or is not fully compatible with the incoming print job. For example, if the printer is not capable of a certain PDL feature, the application may convert the data to support that printer as much as possible. If a printer is limited in its memory resources, the application may render the job as a single job with multiple copies setting. This way, the printer may not have to hold a large chunk of data, and instead, just change the copies setting to multiple copies. Other translation methods and algorithms may be incorporated to "translate" an incoming print job.

Common Workflows and Methods

In one embodiment, the synchronized printer control feature may be turned OFF at the controlled remote printers so that incoming data (e.g., events, operations, and navigations data) may be prevented from taking effect. This may avoid infinite loop or looping of the functionality of this feature on the receiving printer(s) that already have the feature turned ON. In another embodiment, a receiving controlled printer (also known as controlled remote printer) may still receive, apply, and perform received data (e.g., events, operations and navigations data) from the master Controller, even if the receiving controlled printer already has its synchronized printer control feature turned ON.

This capability may provide flexibility and may be a configurable setting. This may be configured, interrupted, and controlled (aborted, cancelled, restarted) at the master controller. In this case, the original master controller and the remote printer that has the feature already turned ON are considered both master controllers. Each may cancel the sending of the data to the other printer. Each may abort processing of received data from the other master controller. In one embodiment, it may be possible to cause aborting, cancellation, or restarting of a remote printer from one master controller. This capability may also be configurable.

Lifetime of the Synchronized Printer Control Feature in the Printer

The synchronized printer control feature may be turned OFF only by the user at one master controller. If left ON, the feature may continue capturing printer panel operations, print jobs, scanned jobs, and other types of events and processes at the master controller, and may continue to send or broadcast them to the controlled remote printers until the master controller application or device itself is turned OFF. The feature may be reset to OFF and be in OFF state after the application or device is rebooted. This may avoid misuse, overuse, or unintended functioning of the synchronized printer control feature when the application or device is restarted.

In another embodiment, this feature may be configured to take effect again after reboot for testing scenarios or use cases such as installing a new firmware, and allowing a master controller to monitor panel messages after rebooting of the printer that got the firmware update. There may be a need to continue using this feature after a reboot; thus, this possibility is provided for flexibility.

FIG. 1 illustrates a unified printer system 100 in accordance with one embodiment. The unified printer system 100 comprises a master controller device 102, a network 104, a connected printer 106a, a connected printer 106b, a connected printer 106c, and a unified printer application interface 108.

The master controller device 102 may be a computer, tablet, or mobile device. It may comprise a computing apparatus 800 such as is described in detail with respect to FIG. 8. It may show a unified printer application interface 108 of common, compatible, and applicable features and settings from selected printers in the network 104. These printers may be selected from among connected printer 106a-106c. The user may interact with the unified printer application interface 108 through input and output devices connected to the master controller device 102, such as a keyboard, mouse, touchscreen, etc. Such devices are described in more detail with respect to FIG. 8, and are well understood by those skilled in the art. The unified printer application interface 108 may be configured to look like a printer display panel interface when implemented on a computing apparatus 800.

From the unified printer application interface 108, the panel operations (scanning, faxing, job storage, image processing, or printing) and panel navigation may be reflected and performed to other printers in the network. Other printers may receive the navigation commands, settings operations, or commands, and processing data from the source printer and performs them locally within the receiving printer's engine.

In one embodiment, rather than sending printer information 112 such as status, results, feedback, timing data, and other operational data from the connected printers to the master controller device 102, such information may be sent to a software service running on a separate server 110. The master controller device may then be configured to query the separate server 110 for the printer information 112 collected.

Figure 2:
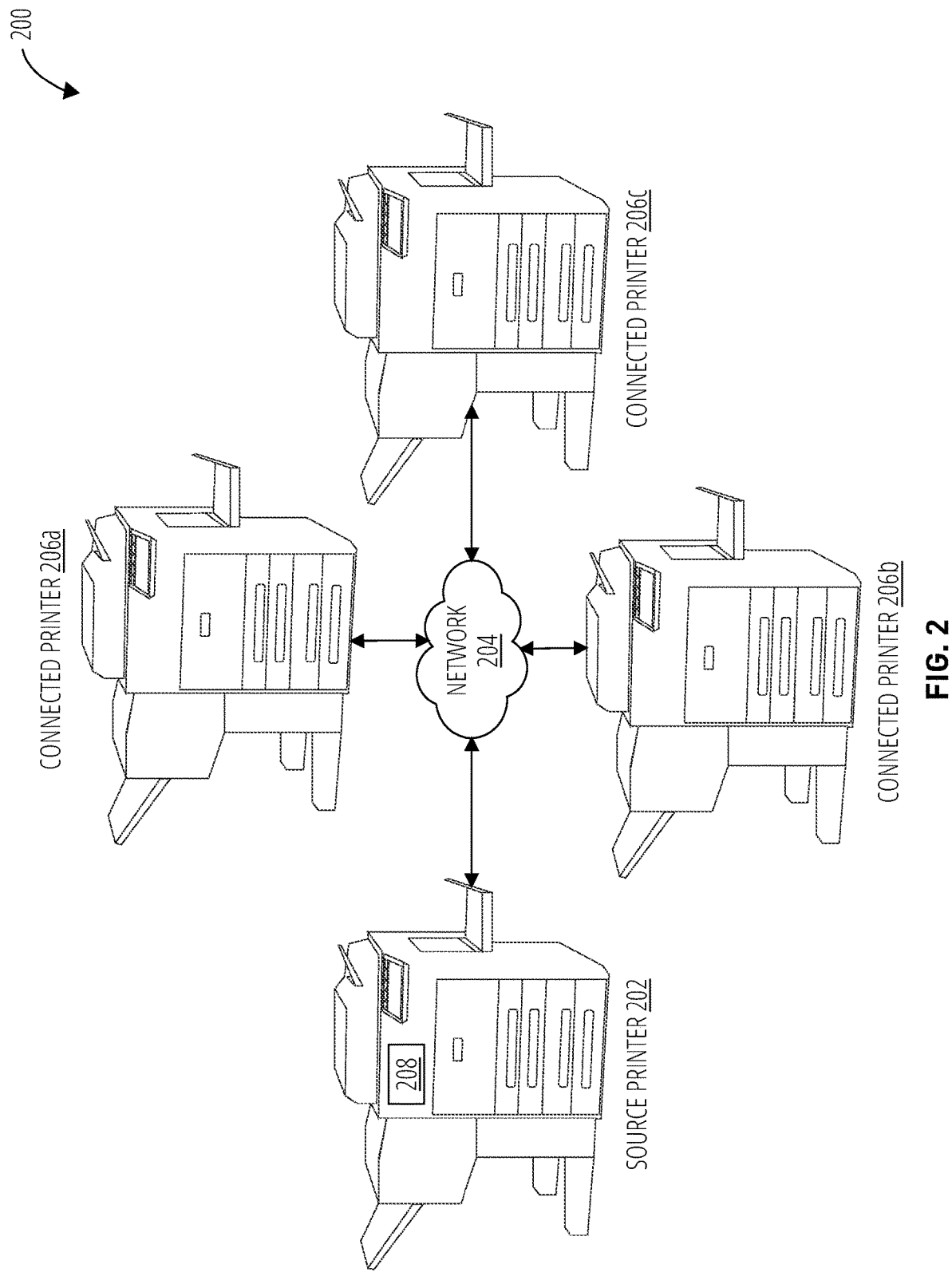
FIG. 2 illustrates a unified printer system 200 in accordance with one embodiment.

FIG. 2 illustrates a unified printer system 200 in accordance with one embodiment. The unified printer system 200 comprises a source printer 202, a network 204, a connected printer 206a, a connected printer 206b, a connected printer 206c, and unified user interface firmware 208.

In one embodiment, connected printers may be configured with the unified user interface firmware, including a source control setting. Turning the source control setting ON for one printer may designate that printer as source printer 202. The source printer 202 may then be configured as the master controller device and present a source printer display panel allowing a user to interact with the unified user interface firmware 208.

This diagram shows a single source printer 202 having the unified user interface firmware 208 installed. Panel operations (scanning, faxing, job storage, image processing, or printing) and panel navigation performed by a user at the source printer 202 may be reflected and performed to other connected printers 206a-206c in the network 204. The connected printers 206a-206c may receive the navigation commands, settings operations or commands, and processing data from the source printer 202 and may perform them locally within the receiving connected printers' engines.

Figure 3:
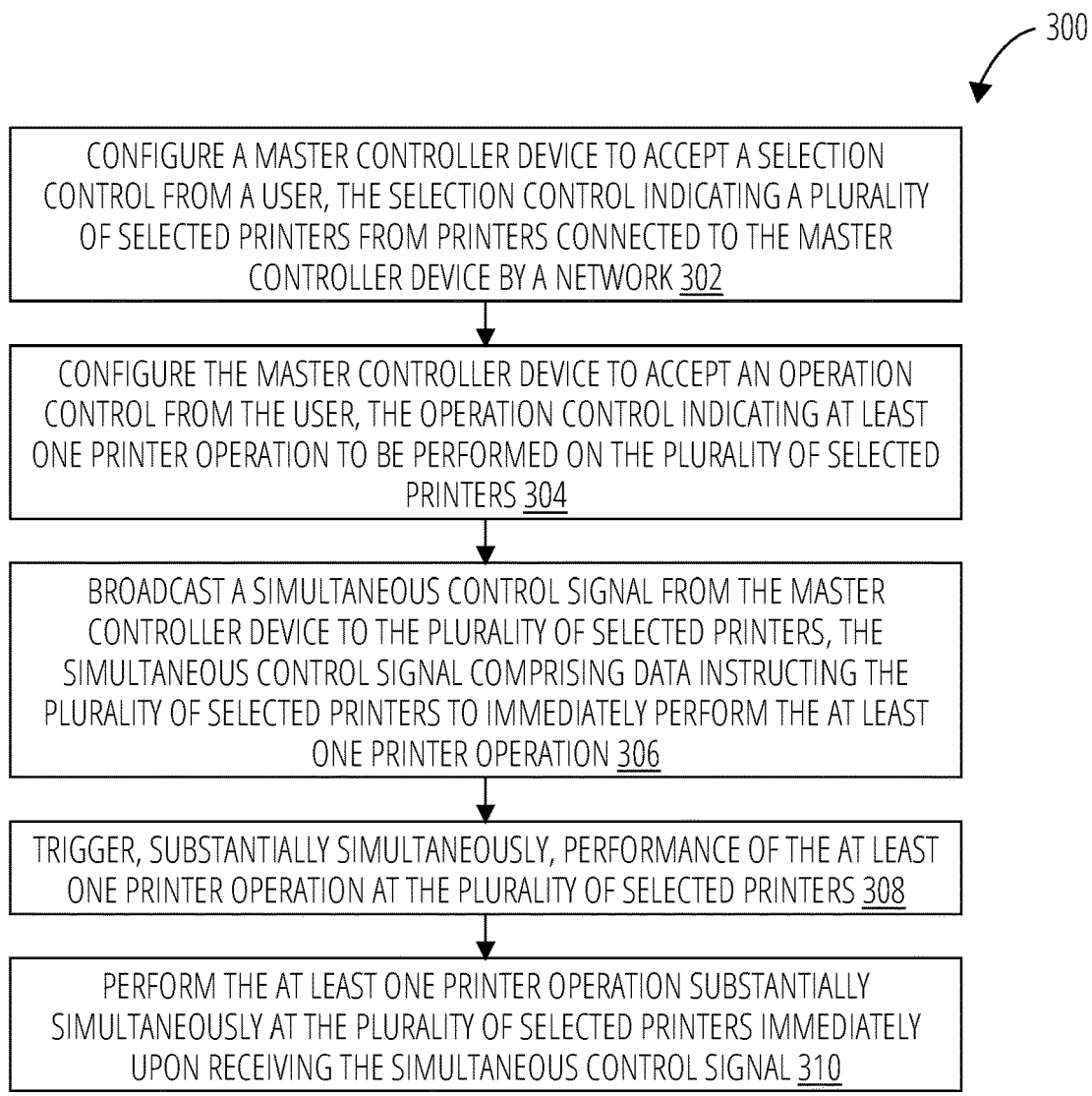
FIG. 3 illustrates a routine 300 in accordance with one embodiment.

FIG. 3 illustrates a routine 300 for operating a unified and decentralized machine interface for control of multi-printer systems in accordance with one embodiment. The routine 300 begins at block 302 by configuring a master controller device to accept a selection control from a user. This may be the master controller device 102 introduced in FIG. 1, or in another embodiment, the source printer 202 introduced in FIG. 2. The selection control may indicate a plurality of selected printers from printers connected to the master controller device by a network, such as the connected printers 106a-106c of the network 104 illustrated in FIG. 1 or the connected printers 206a-206c of network 204 in FIG. 2. The plurality of selected printers may be the plurality of selected printers 410, introduce in FIG. 4 below.

In block 304, the master controller device may be further configured to accept an operation control from the user. The operation control may indicate at least one printer operation to be performed on the plurality of selected printers. A simultaneous control signal may be broadcast from the master controller device to the plurality of selected printers in block 306. The simultaneous control signal may comprise data instructing the plurality of selected printers to immediately perform the at least one printer operation.

The performance of the at least one printer operation at the plurality of selected printers may be triggered, substantially simultaneously, at block 308. In block 310, the at least one printer operation may be performed substantially simultaneously at the plurality of selected printers immediately upon receiving the simultaneous control signal.

Figure 4:
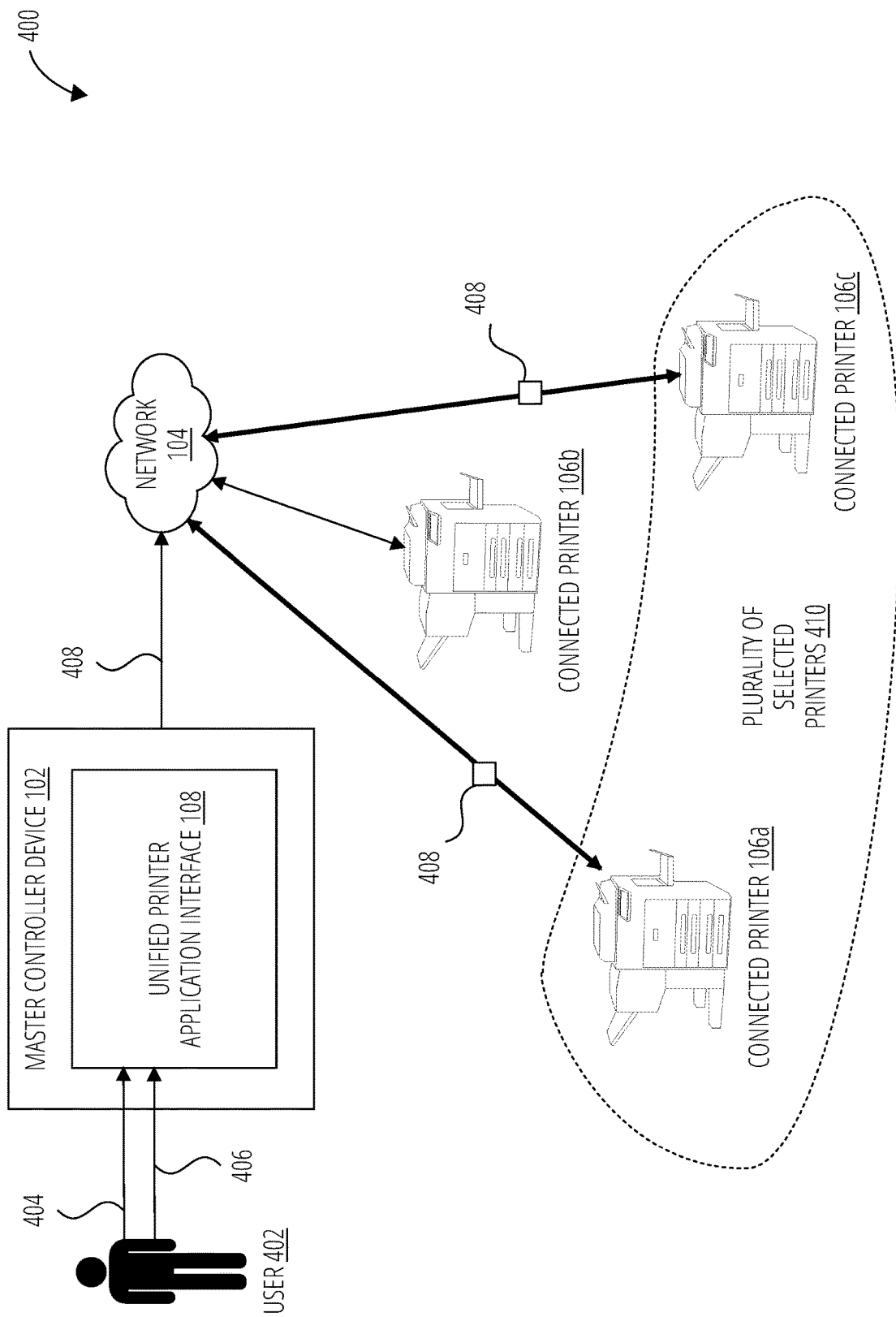
FIG. 4 illustrates a unified printer system 400 in accordance with one embodiment.

FIG. 4 illustrates a unified printer system 400 in accordance with one embodiment. The unified printer system 400 may be configured to implement the routine 300 described with respect to FIG. 3. A user 402 may configure a master controller device 102 having a unified printer application interface 108 installed with a selection control 404 to indicate a plurality of selected printers 410 from among the connected printers 206a-206c, connected to the master controller device 102 by a network 104.

The user may further configure the master controller device 102 with the unified printer application interface 108 installed with an operation control 406, the master controller device 102 in response sending a simultaneous control signal 408 to the plurality of selected printers 410.

In one embodiment, if one of the connected printers 106a-106c encounters a problem in following instructions from the master controller device 102 needing manual correction by personnel, such as a paper jam, toner waste full, or paper tray empty condition, that printer may be excluded from the plurality of selected printers 410 being controlled, as shown with connected printer 106b. Alternately, the unified printer application interface 108 may offer the user 402 an option to exclude that printer, or to pause operations at all printers until the problem is resolved.

Figure 5:
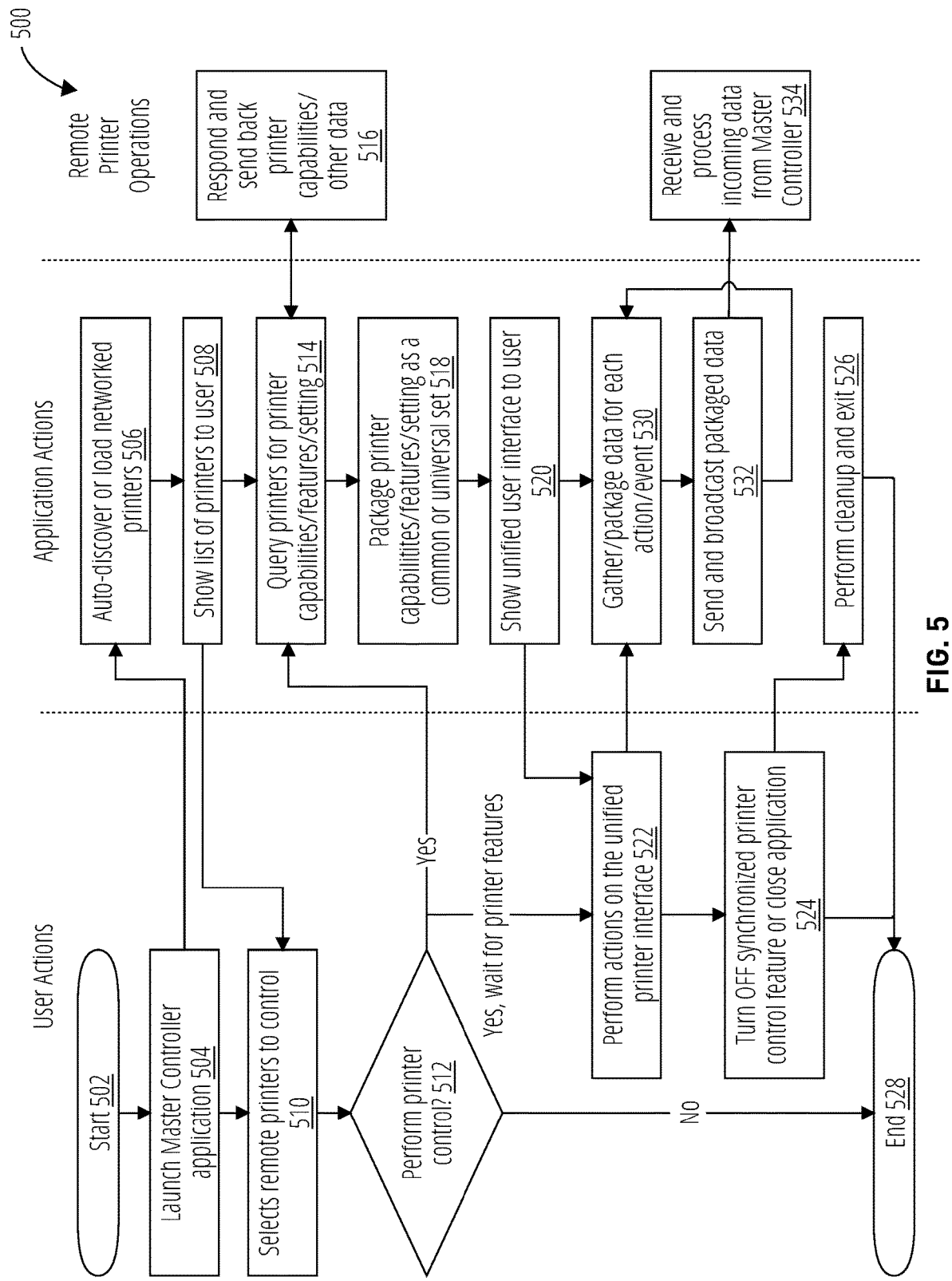
FIG. 5 illustrates a unified printer application interface process 500 in accordance with one embodiment.

FIG. 5 illustrates a unified printer application interface process 500 in accordance with one embodiment. User actions initiate application actions, which in turn trigger remote printer operations, as shown, through the action of an application that implements the synchronized printer control feature. The application itself may be a standalone application, a built-in or integrated feature for an existing application, a plug-in to a printer driver, or an integrated feature or plug-in to an operating system. The application may reside or execute in a desktop computer, laptop, mobile device, or in a web site (i.e., cloud).

The workflow in this embodiment may begin at Start 502. A user may launch a master controller application at block 504. The application may auto-discover networked printers at block 506, in order to present a list of printers to the user at block 508. The application may, in one embodiment, at block 506, load this data from a database for known printer models. The user may select remote printers to control at block 510, from among the list presented at block 508. If the user does not opt to perform printer control at decision block 512, the unified printer application interface process 500 may end 528.

If at decision block 512 the user opts to perform printer control, the application may query the printers for printer capabilities, including features and settings that each printer supports at block 514. In response, remote printers may send printer capabilities and other data back to the application at block 516. This data may include features, settings, finishing devices, and configurable settings, functionalities, to name a few, that the user may perform, change, or configure when the user is actually browsing through or navigating the printer's user interface (front panel, web page, mobile management app).

The application may consolidate, gather, and package the data at block 518 into one of two collections, serving as two possible embodiments: a common unified set, or a universal unified set. For a common unified set, the application may select and package all printer capabilities, features and settings that are common to all selected printers. This may ensure that the user may modify, perform, or affect those features, settings, functions, and operations on all printers at the same time. For a universal unified set, the application may package a set of all possible features, settings, functions, and so on for all selected printers. Some data may not necessarily be supported in some printers. This may allow the user to perform as much or as many actions, features, functions in as many printers as possible. When a selected printer is not compatible with a feature, setting, function, or operation selected by the user from the universal settings, the master controller device may perform a translation rendering the feature, setting, function, or operation into those the printer is capable of performing. Alternatively, the master controller device may notify the user through the unified user interface, may prompt the user to select a different printer compatible with the desired actions, or may omit the selected printer from the broadcast request.

The application may present the set of printer capabilities to the user in a unified user interface at block 520. The user may then at block 522 perform actions on the unified user interface, the application will react and respond to each of those actions. For each action or event that occurs, the application may gather and package those actions, events, movements, changes or processes for sending and broadcasting to the selected controlled remote printers at block 530. The application may broadcast over the connection to the remote printer(s) at block 532. This may be via wired or wireless network, Bluetooth, near-field communication (NFC), or other networking technology known to those skilled in the art. The remote printers may receive and process data from the master controller running the application at block 534. The resulting operations may be performed in real-time to reflect simultaneous, in-parallel, asynchronous, or at-the-same-time performance of those actions on the controlled printers.

The application may stop operating using the synchronized printer control feature either when the user explicitly stops the feature in the application, or when the user closes the application, at block 524. At block 526, the application may do a final clean-up of resources, and may save and remember user actions, changes to features and settings, and the list of preferred printers. The application may then exit and end 528 the unified printer application interface process 500.

Figure 6A:
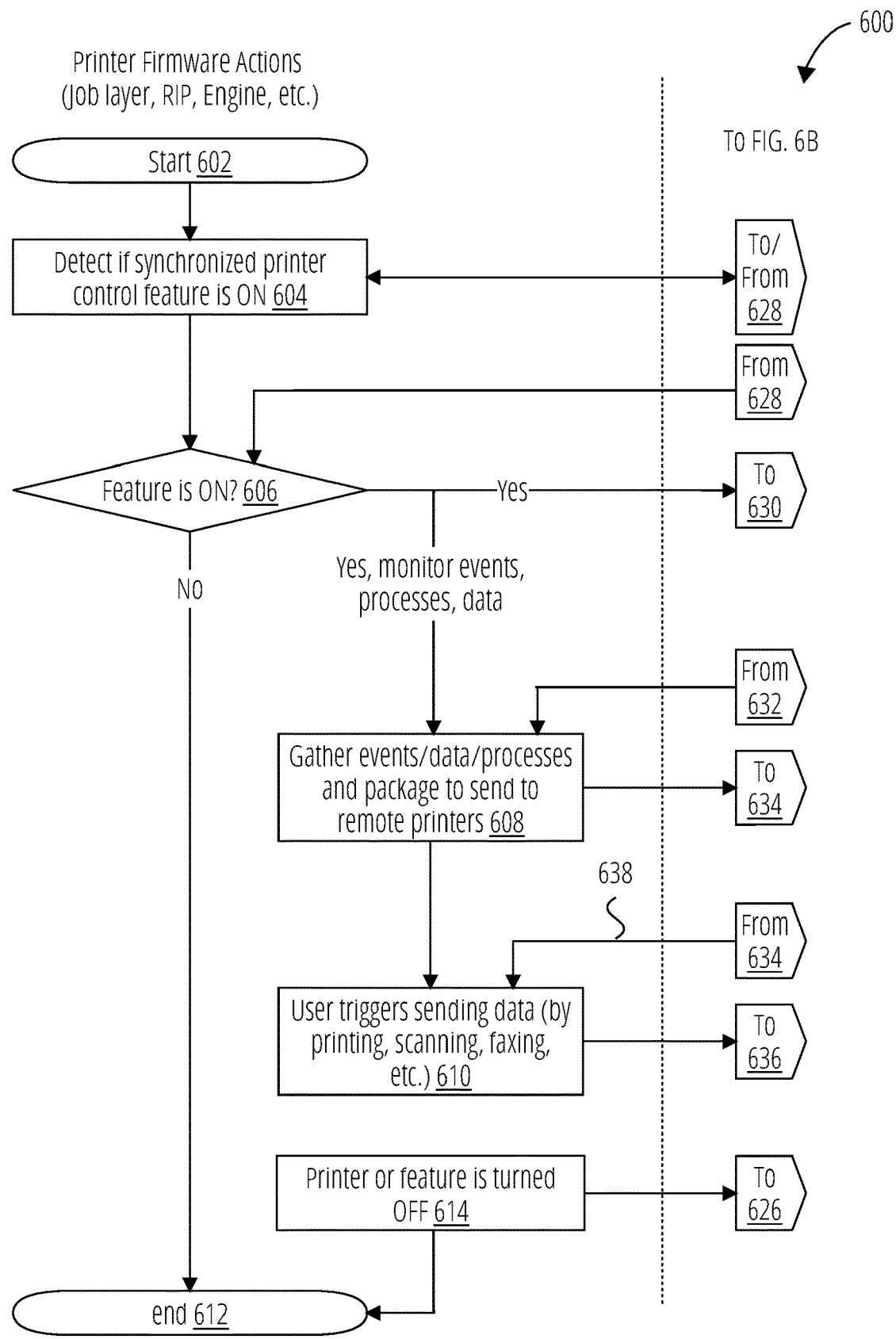
FIG. 6A and FIG. 6B illustrate a unified printer panel interface master controller process 600 in accordance with one embodiment.
Figure 6B:
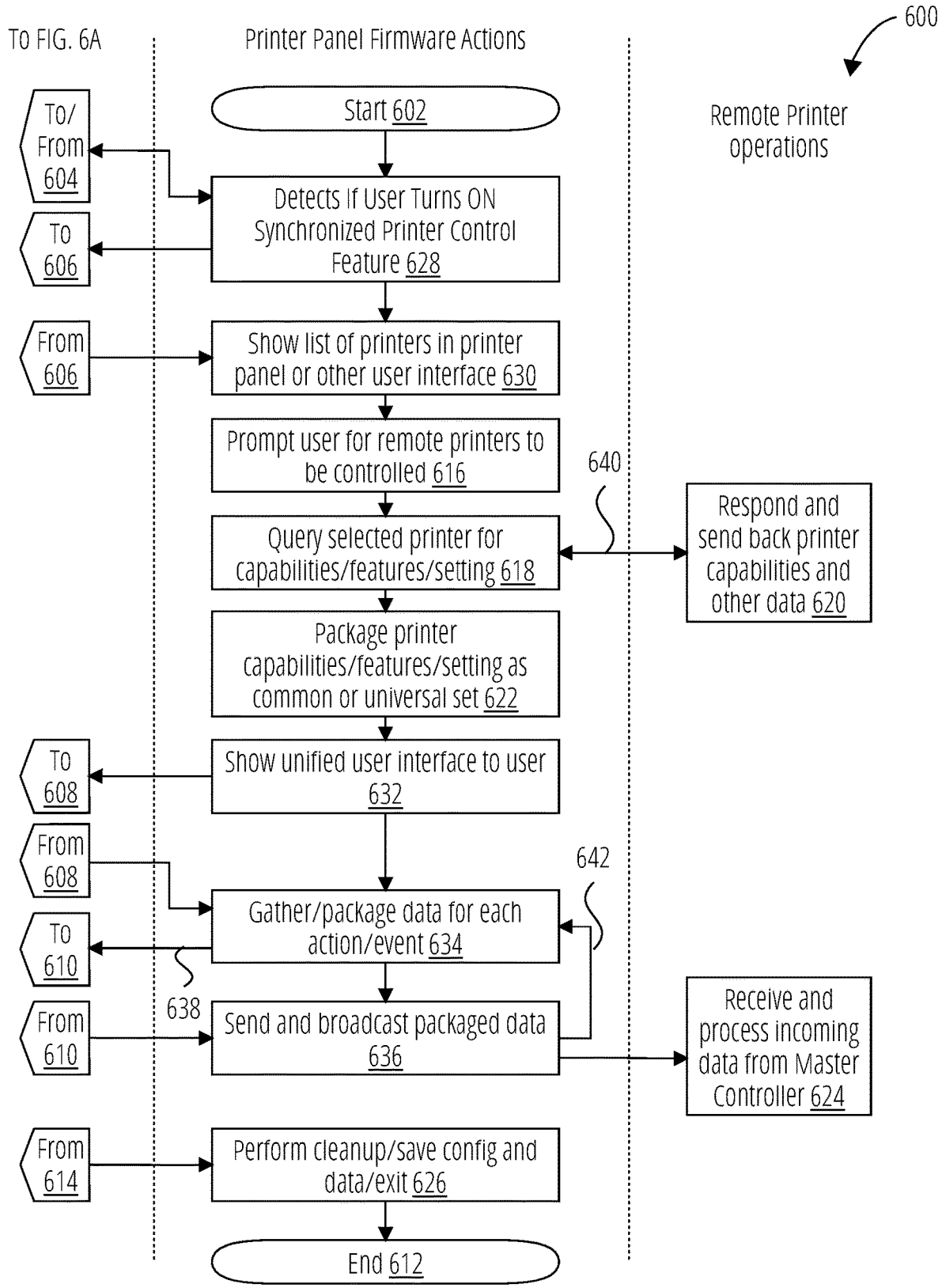

FIG. 6A and FIG. 6B illustrate a unified printer panel interface master controller process 600 in accordance with one embodiment. In FIG. 6A and FIG. 6B, there is a new control in the printer panel or user interface, which may turn ON or OFF the synchronized printer control feature. The unified printer panel interface master controller process 600 may begin at Start 602. At block 604, the printer firmware may detect if the synchronized printer control feature is ON. Alternately, at block 628, printer panel firmware may also detect if a user turns ON this feature to begin the unified printer panel interface master controller process 600. If the feature is determined not to be on at decision block 606, the unified printer panel interface master controller process 600 may end 612.

If the printer firmware detects that the feature is ON in decision block 606, the printer firmware may monitor events, processes, and data through the operation of this feature. Printer panel firmware may display a list of printers in the printer panel or another user interface at block 630. At block 616, the printer panel firmware may prompt the user to select which other remote printers to control. The printer panel firmware may then query for the printer capabilities, features, and settings of the selected printers at block 618. This query may be performed through underlying firmware, such as the main printer firmware, its communication or networking component, and the like. The remote printers may return this data gathered from known printer modules 640 at block 620. At block 622, the printer panel firmware may consolidate the gathered printer capabilities data to form a unified user interface. This may take the form of the common unified set or the universal unified set described previously with respect to FIG. 5.

The unified user interface may be shown in the printer panel at block 632, so that the user performing the actions through the master controller may navigate, make feature and setting changes, perform actions like scanning, printing, faxing, image processing, and the like. The user-desired operations may be gathered by the printer firmware at block 608 and may be packaged to send to remote printers. The printer panel firmware may capture actions and events that occur in the unified user interface and may package them for broadcasting to controlled remote printers at block 634. This may include data gathered in the underlying firmware (such as RIP, job layer, engine firmware) when such data is needed for sending to remote printers. Such data may be gathered in the underlying firmware due to a trigger action 638 in the unified user interface, like a printing, scanning, faxing, image processing, or job storage action detected from the user at block 610.

The printer panel firmware may send and broadcast package data to the remote printer(s) at block 636. The printer panel firmware may further respond to events or actions 642 by returning to block 634 to package data for further action. The remote printer(s) may receive and process data from the master controller at block 624.

At block 614, the printer firmware may detect that the printer or the synchronized printer control feature is turned OFF by a user. At this time, printer firmware actions may end 612. The printer panel firmware may perform clean up actions, safe configuration and other data, and may exit the synchronized printer control feature mode at block 626. The unified printer panel interface master controller process 600 may then be complete and end 612.

Figure 7:
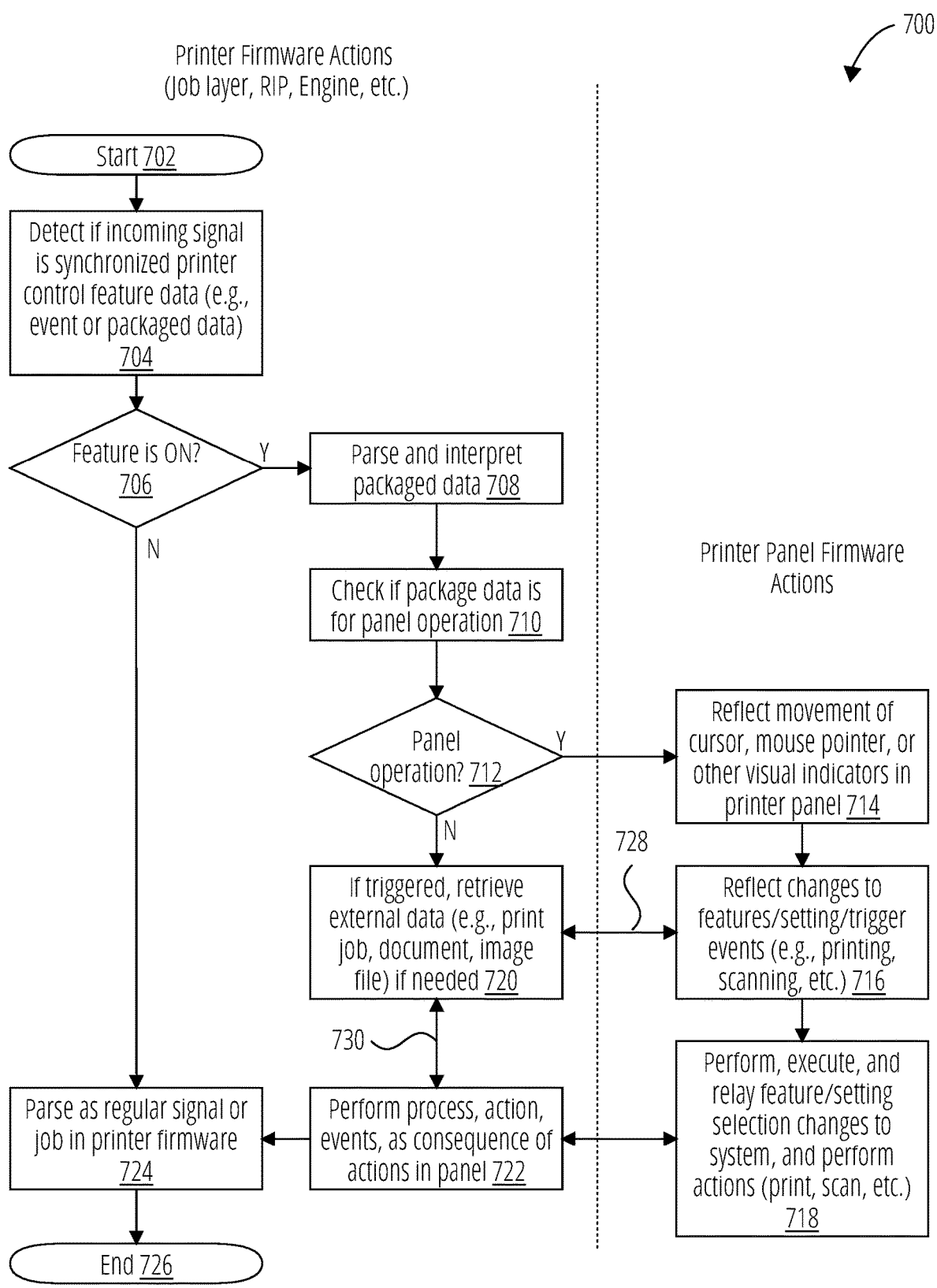
FIG. 7 illustrates a unified printer panel interface receiving printer process 700 in accordance with one embodiment.

FIG. 7 illustrates a unified printer panel interface receiving printer process 700 in accordance with one embodiment. These actions may be performed by printer firmware and printer panel firmware on the remote printer(s) described with respect to FIG. 6A and FIG. 6B. The unified printer panel interface receiving printer process 700 may begin at Start 702. The printer firmware at a remotely controlled printer may detect an incoming signal associated with synchronized printer control feature data at block 704. The signal may be in the form of a print job that includes identifying job ticket parameters that will identify the signal or print job as a job with synchronized printer control feature data. The signal may be in other form-factors that the printer firmware can process, such as Bluetooth data, NFC data, and file transfer protocol (FTP) upload, to name a few.

If the synchronized printer control feature is turned OFF, as detected at decision block 706, the incoming signal may be processed regularly, as the printer signal or job in the remote printer's firmware at block 724. If the feature is determined to be turned ON at decision block 706, the remote printer firmware may parse and interpret the packaged data at block 708. The job ticketing mechanism may use Print Job Language (PJL), XJDF/JDF, XML, Kde Portable Document Format (KPDF) Prescribe, XML Paper Specification (XPS) or other means, depending on and in compliance or compatibility with the signal or print job. For example, Portable Document Format (PDF) works with JDF, XPS jog can have XPS Print Tickets, and other PDLs with PJL.

If the incoming signal includes synchronized printer control feature data, the printer firmware may parse and interpret the data at block 708. In some embodiments, the data may be examined to determine if the desired operation is a panel operation at block 710. If data includes panel operations at decision block 712, the data may be relayed to the printer panel firmware. In the panel firmware, at block 714, any actions, events, movements or other visual indications may be reflected in the panel user interface. A user control may be highlighted when it has been selected or its value (i.e., setting) is changed. Changes in any of the features and/or settings may be executed and processed in the panel firmware at block 716. Changes may be passed onto underlying printer firmware, including components that maintain the printer configuration.

If data is not for panel operations, the printer firmware may process it further to determine if any data needs to be retrieved, with the job if it is a print job, or externally if the signal specify external data or resources, such as how XJDF may specify it. Data retrieved in this manner may be stored until a trigger action 728 is received from the processing of the data sent to the panel.

If an action is a trigger action 728 like scanning, printing, faxing, image processing, job storage, or the like, the action may be relayed to underlying firmware including scanner firmware, fax firmware, RIP, job layer and so on, to start executing, processing and performing of the action at the underlying firmware components. An advance trigger action may be sent to the underlying firmware to initiate retrieval of needed data such as downloading of a file using XJDF information, or parsing of data from incoming signal, if not yet parsed. This is indicated at block 720. The firmware may use or retrieve any needed data 730, and may then perform the triggered action, such as scanning, printing, faxing, and so on, at block 722. The printer panel firmware may likewise perform, execute, and relay changes to the system, as well as perform indicated actions, at block 718. Once the action has been completed, the unified printer panel interface receiving printer process 700 may come to an end 726.

Figure 8:
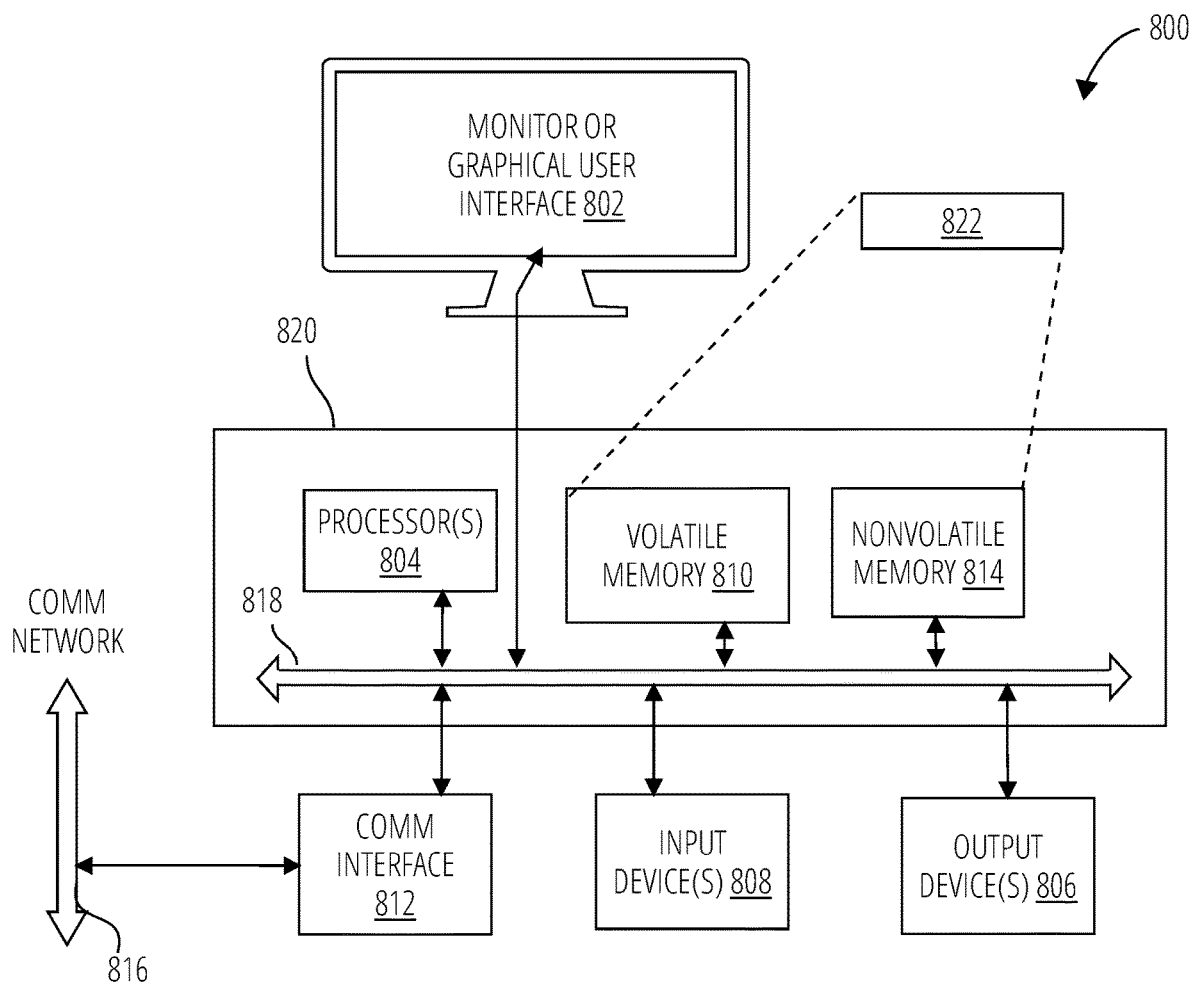
FIG. 8 is an example block diagram of a computing apparatus 800 that may incorporate embodiments of the present disclosure.

FIG. 8 is an example block diagram of a computing apparatus 800 that may incorporate embodiments of the present disclosure. FIG. 8 is merely illustrative of a machine system to carry out aspects of the technical processes described herein and does not limit the scope of the claims. One of ordinary skill in the art would recognize other variations, modifications, and alternatives. In one embodiment, the computing apparatus 800 typically includes a monitor or graphical user interface 802, a data processing system 820, a communication network interface 812, input device(s) 808, output device(s) 806, and the like.

As depicted in FIG. 8, the data processing system 820 may include one or more processor(s) 804 that communicate with a number of peripheral devices via a bus subsystem 818. These peripheral devices may include input device(s) 808, output device(s) 806, communication network interface 812, and a storage subsystem, such as a volatile memory 810 and a nonvolatile memory 814.

The volatile memory 810 and/or the nonvolatile memory 814 may store computer-executable instructions and thus forming logic 822 that when applied to and executed by the processor(s) 804 implement embodiments of the processes disclosed herein.

The input device(s) 808 include devices and mechanisms for inputting information to the data processing system 820. These may include a keyboard, a keypad, a touch screen incorporated into the monitor or graphical user interface 802, audio input devices such as voice recognition systems, microphones, and other types of input devices. In various embodiments, the input device(s) 808 may be embodied as a computer mouse, a trackball, a track pad, a joystick, wireless remote, drawing tablet, voice command system, eye tracking system, and the like. The input device(s) 808 typically allow a user to select objects, icons, control areas, text and the like that appear on the monitor or graphical user interface 802 via a command such as a click of a button or the like.

The output device(s) 806 include devices and mechanisms for outputting information from the data processing system 820. These may include the monitor or graphical user interface 802, speakers, printers, infrared light emitting diodes (LEDs), and so on as well understood in the art.

The communication network interface 812 provides an interface to communication networks (e.g., communication network 816) and devices external to the data processing system 820. The communication network interface 812 may serve as an interface for receiving data from and transmitting data to other systems. Embodiments of the communication network interface 812 may include an Ethernet interface, a modem (telephone, satellite, cable, integrated services digital network or ISDN), (asynchronous) digital subscriber line (DSL), FireWire, USB, a wireless communication interface such as BlueTooth or WiFi, a near field communication wireless interface, a cellular interface, and the like.

The communication network interface 812 may be coupled to the communication network 816 via an antenna, a cable, or the like. In some embodiments, the communication network interface 812 may be physically integrated on a circuit board of the data processing system 820, or in some cases may be implemented in software or firmware, such as "soft modems", or the like.

The computing apparatus 800 may include logic that enables communications over a network using protocols such as HTTP, TCP/IP, RTP/RTSP, IPX, UDP and the like.

The volatile memory 810 and the nonvolatile memory 814 are examples of tangible media configured to store computer readable data and instructions to implement various embodiments of the processes described herein. Other types of tangible media include removable memory (e.g., pluggable USB memory devices, mobile devices SIM cards), optical storage media such as CD-ROMS, DVDs, semiconductor memories such as flash memories, non-transitory read-only-memories (ROMS), battery-backed volatile memories, networked storage devices, and the like. The volatile memory 810 and the nonvolatile memory 814 may be configured to store the basic programming and data constructs that provide the functionality of the disclosed processes and other embodiments thereof that fall within the scope of the present disclosure.

Logic 822 that implements embodiments of the present disclosure may be stored in the volatile memory 810 and/or the nonvolatile memory 814. Said logic 822 may be read from the volatile memory 810 and/or nonvolatile memory 814 and executed by the processor(s) 804. The volatile memory 810 and the nonvolatile memory 814 may also provide a repository for storing data used by the logic 822.

The volatile memory 810 and the nonvolatile memory 814 may include a number of memories including a main random access memory (RAM) for storage of instructions and data during program execution and a read only memory (ROM) in which read-only non-transitory instructions are stored. The volatile memory 810 and the nonvolatile memory 814 may include a file storage subsystem providing persistent (non-volatile) storage for program and data files. The volatile memory 810 and the nonvolatile memory 814 may include removable storage systems, such as removable flash memory.

The bus subsystem 818 provides a mechanism for enabling the various components and subsystems of data processing system 820 communicate with each other as intended. Although the communication network interface 812 is depicted schematically as a single bus, some embodiments of the bus subsystem 818 may utilize multiple distinct busses.

It will be readily apparent to one of ordinary skill in the art that the computing apparatus 800 may be a device such as a smartphone, a desktop computer, a laptop computer, a rack-mounted computer system, a computer server, or a tablet computer device. As commonly known in the art, the computing apparatus 800 may be implemented as a collection of multiple networked computing devices. Further, the computing apparatus 800 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g., read/write volatile or nonvolatile memory or media).

Herein, references to "one embodiment" or "an embodiment" do not necessarily refer to the same embodiment, although they may. Unless the context clearly specifies otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following claims.

What is claimed is:

1. A method comprising:
configuring a master controller device to accept a selection control from a user, the selection control indicating a plurality of selected printers from printers connected to the master controller device by a network;
configuring the master controller device to accept an operation control from the user, the operation control indicating at least one printer operation to be performed on the plurality of selected printers;
gathering settings from the printers connected to the master controller device, the gathered settings comprising at least one of:
universal settings, the universal settings controlling features and capabilities supported by a least one of the plurality of selected printers; and
common settings, the common settings controlling features and capabilities supported by all of the plurality of selected printers;
modifying the gathered settings to generate modified settings, the modified settings indicating a least one of a configuration and an operation to be actuated at the plurality of selected printers;
packaging the modified settings as a simultaneous control signal;
broadcasting the simultaneous control signal from the master controller device to the plurality of selected printers, the simultaneous control signal comprising data instructing the plurality of selected printers to immediately perform the at least one printer operation;
triggering, substantially simultaneously with the broadcasting of the simultaneous control signal, performance of the at least one printer operation at the plurality of selected printers; and
performing the at least one printer operation substantially simultaneously at the plurality of selected printers immediately upon receiving the simultaneous control signal.

2. The method of claim 1, further comprising: on condition that the modified settings are not supported by one of the plurality of selected printers, performing at least one of: translating the modified settings into printer-specific settings, the printer-specific settings being processable by an incompatible selected printer, wherein the incompatible selected printer is unable to process the modified settings when untranslated; notifying the user; prompting the user to select a different printer to include in the broadcast of the simultaneous control signal; and omitting the one of the plurality of selected printers from the broadcast of the simultaneous control signal.

3. The method of claim 1, further comprising translating the modified settings into printer-specific settings, the printer-specific settings being processable by an incompatible selected printer, wherein the incompatible selected printer is unable to process the modified settings when untranslated.

4. The method of claim 1, the master controller device comprising a computing device configured with a unified user interface application, further configuring the computing device to allow the user to interact with the unified user interface through input and output devices of the computing device.

5. The method of claim 4, further comprising configuring selected printer display panels to mirror user actions detected by the unified user interface application in real-time.

6. The method of claim 4, the unified user interface application configured to look like a printer display panel interface.

7. The method of claim 1, further comprising:
on condition that at least one of the plurality of selected printers encounters a problem, performing at least one of:
excluding the at least one of the plurality of selected printers from the plurality of selected printers performing the at least one printer operation;
offering the user an option to exclude the at least one of the plurality of selected printers from the plurality of selected printers performing the at least one printer operation; and
offering the user an option to pause the at least one printer operation for the plurality of selected printers.

8. The method of claim 1, further comprising:
collecting information including at least one of status, results, feedback, timing data, and other operational data from the plurality of selected printers at least one of the master controller device and a software service running on a separate server; and
on condition that collection is at the separate server:
configuring the master controller device to query the separate server for the information collected.

9. The method of claim 1, further comprising:
configuring the connected printers with unified user interface firmware, wherein the unified user interface firmware includes a source control setting, the source control setting designating the connected printer as a source printer when the source control setting is turned ON;
turning the source control setting ON for one of the connected printers, thereby designating it as the source printer;
configuring the source printer as the master controller device; and
configuring a source printer display panel to allow the user to interact with the unified user interface firmware.

10. The method of claim 9, further comprising configuring selected printer display panels to mirror user actions taken at the source printer display panel in real-time.

11. The method of claim 9, further comprising configuring the connected printers to suspend function of the unified user interface firmware on condition that the connected printers have a task in progress when the simultaneous control signal is broadcast.

12. The method of claim 9, further configuring the connected printers to suspend function on condition that the connected printers are incompatible with the source printer.

13. A computing apparatus comprising:
a processor; and
a memory storing instructions that, when executed by the processor, configure the apparatus to:
configure a master controller device to accept a selection control from a user, the selection control indicating a plurality of selected printers from printers connected to the master controller device by a network;
configure the master controller device to accept an operation control from the user, the operation control indicating at least one printer operation to be performed on the plurality of selected printers;
gather settings from the printers connected to the master controller device, the gathered settings comprising at least one of:
universal settings, the universal settings controlling features and capabilities supported by at least one of the plurality of selected printers; and
common settings, the common settings controlling features and capabilities supported by all of the plurality of selected printers;
modify the gathered settings to generate modified settings, the modified settings indicating at least one of a configuration and an operation to be actuated at the plurality of selected printers;
package the modified settings as a simultaneous control signal;
broadcast the simultaneous control signal from the master controller device to the plurality of selected printers, the simultaneous control signal comprising data instructing the plurality of selected printers to immediately perform the at least one printer operation;
trigger, substantially simultaneously with the broadcast of the simultaneous control signal, performance of the at least one printer operation at the plurality of selected printers; and
perform the at least one printer operation substantially simultaneously at the plurality of selected printers immediately upon receiving the simultaneous control signal.

14. The computing apparatus of claim 13, the instructions further configuring the apparatus to: on condition that the modified settings are not supported by one of the plurality of selected printers, perform at least one of: translate the modified settings into printer-specific settings, the printer-specific settings being processable by an incompatible selected printer, wherein the incompatible selected printer is unable to process the modified settings when untranslated; notify the user; prompt the user to select a different printer to include in the broadcast of the simultaneous control signal; and omit the one of the plurality of selected printers from the broadcast of the simultaneous control signal.

15. The computing apparatus of claim 13, wherein the instructions further configure the apparatus to translate the modified settings into printer-specific settings, the printer-specific settings being processable by an incompatible selected printer, wherein the incompatible selected printer is unable to process the modified settings when untranslated.

16. The computing apparatus of claim 13, the master controller device comprising a computing device configured with a unified user interface application and the instructions further configuring the computing device to allow the user to interact with the unified user interface through input and output devices of the computing device.

17. The computing apparatus of claim 16, wherein the instructions further configure selected printer display panels to mirror user actions detected by the unified user interface application in real-time.

18. The computing apparatus of claim 16, wherein the instructions further configure the unified user interface application to look like a printer display panel interface.

19. The computing apparatus of claim 13, the instructions further configuring the apparatus to:
on condition that at least one of the plurality of selected printers encounters a problem, perform at least one of:
exclude the at least one of the plurality of selected printers from the plurality of selected printers performing the at least one printer operation;
offer the user an option to exclude the at least one of the plurality of selected printers from the plurality of selected printers performing the at least one printer operation; and
offer the user an option to pause the at least one printer operation for the plurality of selected printers.

20. The computing apparatus of claim 13, the instructions further configuring the apparatus to:
   collect information including at least one of status, results, feedback, timing data, and other operational data from the plurality of selected printers at least one of the master controller device and a software service running on a separate server; and
   on condition that collection is at the separate server:
      configure the master controller device to query the separate server for the information collected.

21. The computing apparatus of claim 13, the instructions further configuring the apparatus to:
   configure the connected printers with unified user interface firmware, wherein the unified user interface firmware includes a source control setting, the source control setting designating the connected printer as a source printer when the source control setting is turned ON;
   turn the source control setting ON for one of the connected printers, thereby designating it as the source printer;
   configure the source printer as the master controller device; and
   configure a source printer display panel to allow the user to interact with the unified user interface firmware.

22. The computing apparatus of claim 21, wherein the instructions further configure selected printer display panels to mirror user actions taken at the source printer display panel in real-time.

23. The computing apparatus of claim 21, wherein the instructions further configure the connected printers to suspend function of the unified user interface firmware on condition that the connected printers have a task in progress when the simultaneous control signal is broadcast.

24. The computing apparatus of claim 21, wherein the instructions further configure the connected printers to suspend function on condition that the connected printers are incompatible with the source printer.

25. A method comprising:
   configuring a master controller device to accept a selection control from a user, the selection control indicating a plurality of selected printers from printers connected to the master controller device by a network;
   configuring the master controller device to accept an operation control from the user, the operation control indicating at least one printer operation to be performed on the plurality of selected printers;
   configuring the connected printers with unified user interface firmware, wherein the unified user interface firmware includes a source control setting, the source control setting designating the connected printer as a source printer when the source control setting is turned ON;
   turning the source control setting ON for one of the connected printers, thereby designating it as the source printer;
   configuring the source printer as the master controller device; and
   configuring a source printer display panel to allow the user to interact with the unified user interface firmware;
   broadcasting a simultaneous control signal from the master controller device to the plurality of selected printers, the simultaneous control signal comprising data instructing the plurality of selected printers to immediately perform the at least one printer operation;
   triggering, substantially simultaneously with the broadcasting of the simultaneous control signal, performance of the at least one printer operation at the plurality of selected printers; and
   performing the at least one printer operation substantially simultaneously at the plurality of selected printers immediately upon receiving the simultaneous control signal.

* * * * *